(12) United States Patent
Huang et al.

(10) Patent No.: US 6,407,220 B1
(45) Date of Patent: Jun. 18, 2002

(54) REACTIVE FORMAZAN DYESTUFFS

(75) Inventors: Huei Ching Huang, Ba Te; Wen-Jang Chen, Chung-Li, both of (TW)

(73) Assignee: Everlight USA, Inc., Pineville, NC (US)

( * ) Notice: Subject to any disclaimer, the term of this patent is extended or adjusted under 35 U.S.C. 154(b) by 0 days.

(21) Appl. No.: 10/014,597

(22) Filed: Dec. 14, 2001

(51) Int. Cl.$^7$ .................. C09B 50/00; C09B 62/463
(52) U.S. Cl. .................. 534/618; 534/652; 544/181; 544/194; 544/204
(58) Field of Search .................. 534/618, 652; 544/181, 194, 204

(56) References Cited

U.S. PATENT DOCUMENTS 4,556,706 A * 12/1985 Hegar et al. ............ 534/618
4,607,098 A *  8/1986 Schwaiger ............... 534/618
5,858,026 A *  1/1999 Kim ....................... 534/618

* cited by examiner

*Primary Examiner*—Floyd D. Higel
*Assistant Examiner*—Kamal Saeed
(74) *Attorney, Agent, or Firm*—Bacon & Thomas, PLLC

(57) ABSTRACT

The present invention provides reactive formazan dyestuffs of the general formula (I),

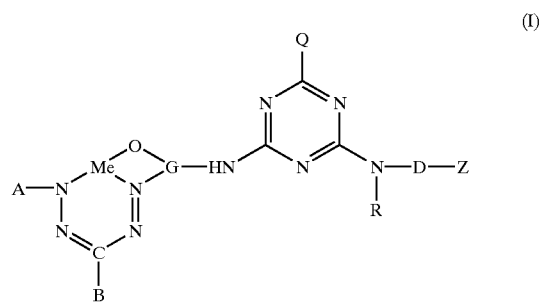

Wherein A, B, D, Me, Q, R, and Z are defined in this document. The dyes according to the invention are distinguished by high fixation and a very good build-up. They are distinguished also by a low substantivity and a high exhaustion, and they have fiber-reactive properties and are very highly suitable for dyeing and printing of materials containing either cellulose fibers.

22 Claims, No Drawings

REACTIVE FORMAZAN DYESTUFFS

FIELD OF THE INVENTION

The present invention relates to a fiber-reactive dyestuff, especially relates to a novel reactive formazan dyestuff.

BACKGROUND OF THE INVENTION

United Kingdom Patent Publication 1,194,504 discloses formazan derivatives having the following formula:

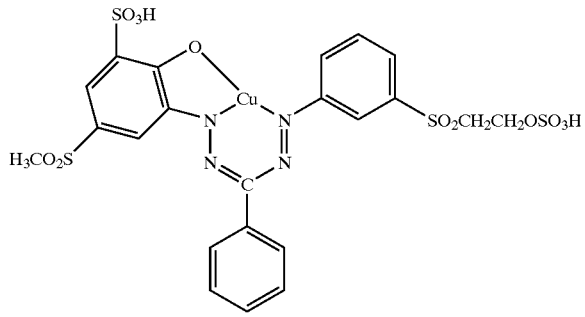

The fastness and dyeing properties of the said formazan derivatives are not good.

U.S. Pat. No. 4,607,098 discloses compounds of the following formula which exhibit improved fastness but with poor dyeing properties

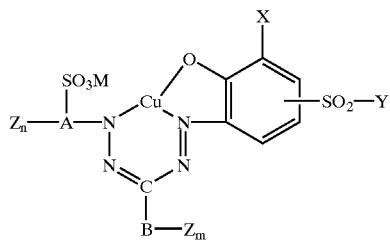

and fastness to chlorinated water.

U.S. Pat. No. 5,858,026 discloses formazan derivatives having the following formula:

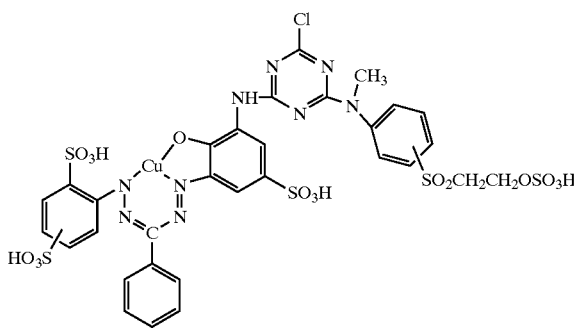

The above formazan derivatives still display poor dyeing properties.

SUMMARY OF THE INVENTION

The present invention provides novel reactive formazan dyestuffs of the following formula (I):

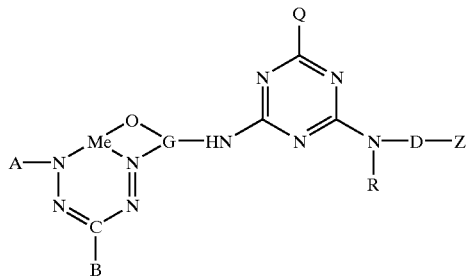

wherein:
A is phenyl or naphthyl having 1 to 4 substituent groups, said substituent groups are selected from the group consisting of halogen, $C_{1-4}$ alkyl, $C_{1-4}$ alkoxyl, nitro, amino, hydroxyl, carboxyl, phosphonic acid and sulfo group, and wherein at least one substituent group is a sulfo group, said sulfo group is in the position ortho to the N-atom of hydrazone compound; preferably A is phenyl having 1 to 4 substituent groups;

B is a straight or branched $C_{1-8}$ alkyl, or a phenyl, naphthyl or heteroaromatic group having 0 to 3 substituent groups, said substituent groups are selected from the group consisting of halogen, $C_{1-4}$ alkyl, $C_{1-4}$ alkoxyl, nitro, amino, hydroxyl, carboxyl, phosphonic acid and sulfo group, said heteroaromatic group is selected from the group consisting of: furan, thiophene, pyrrole, imidazole, pyrazole, pyridine, pyrimidine, quinoline, or benzimidazole; preferably B is phenyl having 0 to 3 substituent groups;

G is a phenyl or naphthyl having 0 to 3 substituent groups, said substituent groups are selected from the group consisting of halogen, $C_{1-4}$ alkyl, $C_{1-4}$ alkoxyl, nitro, amino, hydroxyl, carboxyl, phosphonic acid and sulfo group; preferably G is phenyl having 0 to 3 substituent groups;

Q is —NHCN, —OH, —SCH$_2$COOH or 3-carboxypyridinium;

D is a phenyl or naphthyl having 0 to 3 substituent groups, said substituent groups are selected from the group consisting of halogen, $C_{1-4}$ alkyl, $C_{1-4}$ alkoxyl, nitro, amino, hydroxyl, carboxyl, phosphonic acid and sulfo group; preferably D is phenyl having 0 to 3 substituent groups;

Me is Cu, Ni or Co metal ion; preferably Me is Cu metal ion;

R is H, $C_{1-8}$ alkyl, or $C_{1-8}$ alkyl having at least one substituent group, said substituent group is selected from the group consisting of hydroxyl, carboxyl, sulfo, carbamoyl, and methoxy carbonyl; preferably R is H, $C_{1-4}$ alkyl;

Z is —SO$_2$—Y, —CONH—(CH$_2$)$_h$—SO$_2$—Y, —(O)$_p$—(CH$_2$)$_g$—CONH—(CH$_2$)$_h$—SO$_2$—Y, or —NH—CO—T; Y is —CH=CH$_2$, or —CH$_2$—CH$_2$—U; U is —OSO$_3$H, Cl, Br, —OPO$_3$H$_2$, —SSO$_3$H or

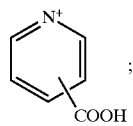

;

T is α, β-halopropionyl or α-haloacryloyl; g and h independently are an integer from 1 to 6;

P is the number 0 or 1; preferably Z is —SO₂—Y or —NH—CO—T, and Y is —CH=CH₂, or —CH₂—CH₂—OSO₃H, and T is α, β-halopropionyl or α-haloacryloyl.

The compounds of the general formula (I) according to the present invention can be present in the acid form or in the form of their salts, in particular the alkali and alkaline earth metal salts. They find use, preferably in the form of the alkali metal salts, for dyeing and printing hydroxy and/or amide containing materials, in particular fiber materials.

The formula (I) dyestuff of the present invention is preferably the following formula (Ia) dyestuff,

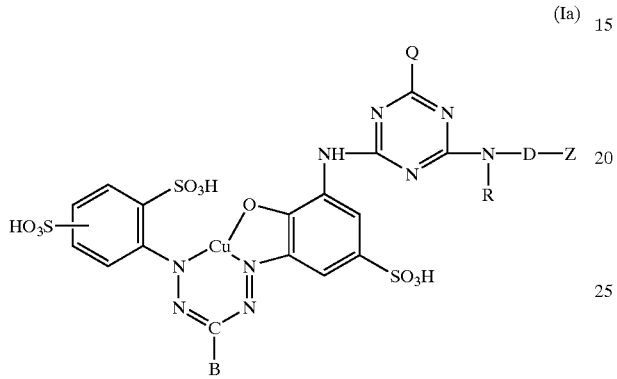

(Ia)

wherein

B is a straight or branched C₁₋₈ alkyl, or a phenyl, naphthyl or heteroaromatic group having 0 to 3 substituent groups, said substituent groups are selected from the group consisting of halogen, C₁₋₄ alkyl, C₁₋₄ alkoxyl, nitro, amino, hydroxyl, carboxyl, phosphonic acid and sulfo group, said heteroaromatic group is selected from the group consisting of: furan, thiophene, pyrrole, imidazole, pyrazole, pyridine, pyrimidine, quinoline, or benzimidazole; preferably B is phenyl having 0 to 3 substituent groups;

Q is —NHCN, —OH, —SCH₂COOH or 3-carboxypyridinium;

D is a phenyl or naphthyl having 0 to 3 substituent groups, said substituent groups are selected from the group consisting of halogen, C₁₋₄ alkyl, C₁₋₄ alkoxyl, nitro, amino, hydroxyl, carboxyl, phosphonic acid and sulfo group; preferably D is phenyl having 0 to 3 substituent groups;

R is H, C₁₋₈ alkyl, or C₁₋₈ alkyl having at least one substituent group, said substituent group is selected from the group consisting of hydroxyl, carboxyl, sulfo, carbamoyl, and methoxy carbonyl; preferably R is H or C₁₋₄ alkyl;

Z is —SO₂—Y, —CONH—(CH₂)ₕ—SO₂—Y, —(O)ₚ—(CH₂)ᵍ—CONH—(CH₂)ₕ—SO₂—Y, or —NH—CO—T; Y is —CH=CH₂, or —CH₂—CH₂—U; U is —OSO₃H, Cl, Br, —OPO₃H₂, —SSO₃H or

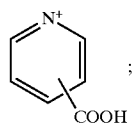

T is α, β-halopropionyl or α-haloacryloyl; g and h independently are an integer from 1 to 6; P is the number 0 or 1; preferably Z is —SO₂—Y or —NH—CO—T, Y is —CH=CH₂, or —CH₂—CH₂—OSO₃H, T is α, β-halopropionyl or α-haloacryloyl.

The formula (I) dyestuff of the present invention is also preferably the following formula (Ib) dyestuff,

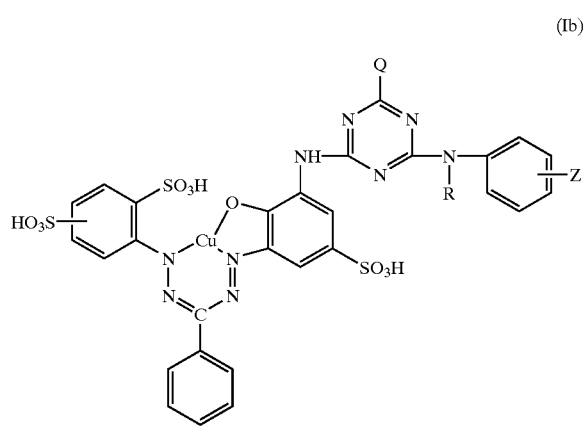

(Ib)

wherein

Q is —NHCN, —OH, —SCH₂COOH or 3-carboxypyridinium;

R is H, C₁₋₄ alkyl; preferably R is H;

Z is —SO₂—Y; Y is —CH=CH₂ or —CH₂—CH₂—U; U is —OSO₃H, Cl or Br; preferably Z is —SO₂—CH₂—CH₂—OSO₃H.

The formula (I) dyestuff of the present invention is also preferably the following formula (Ic), (Id) or (Ie) dyestuff,

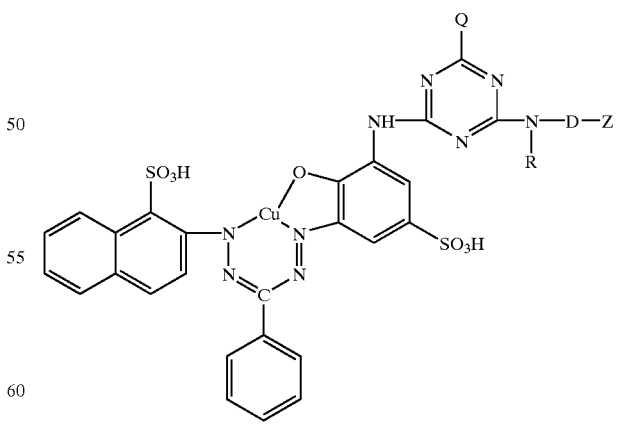

wherein Q, R, D, and Z are define as the formula (Ia) dyestuff of the above.

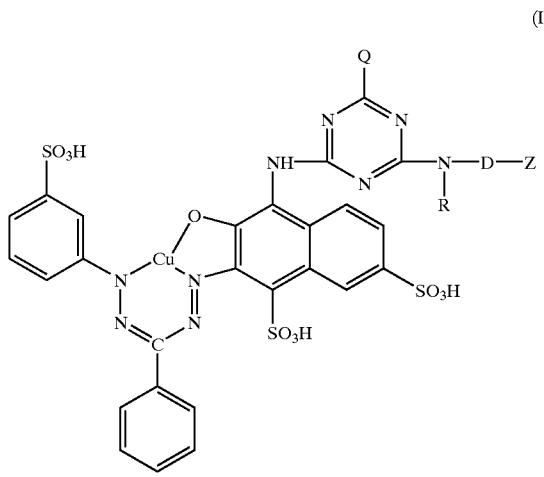

(Id)

wherein Q, R, D, and Z are defined as the formula (Ia) dyestuff of the above.

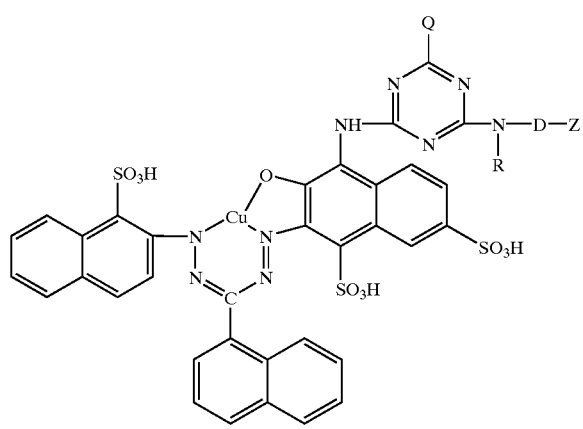

(Ie)

wherein Q, R, D, and Z are defined as the formula (Ia) dyestuff of the above.

The present invention is also related to the process for dyeing and printing cellulosic fiber materials (for example, cotton), which comprises treating the fiber materials with the formula (I) dyestuff in aqueous solution.

DESCRIPTION OF THE PREFERRED EMBODIMENTS

The formula (I) dyestuffs of the present invention can be synthesized by the following reaction step (a) to step (c).

Step (a):

The compound of the formula (III) is reacted with 1,3,5-trihalogen triazine of the following formula (IV) to obtain the following formula (V) compound,

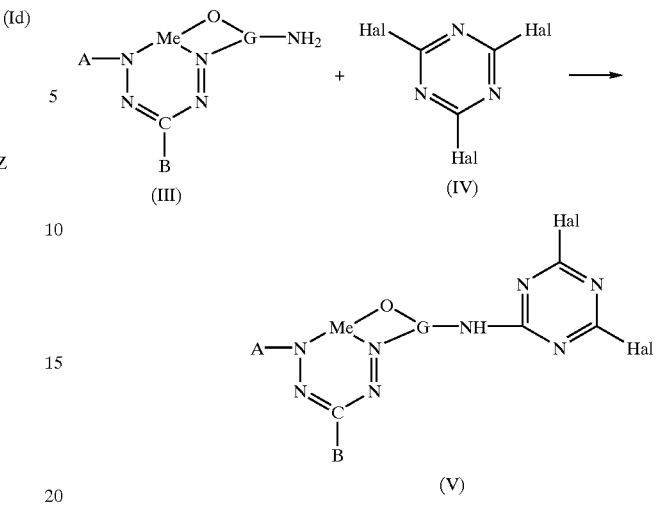

wherein Hal is —F, —Cl, —Br; A, B, G, and Me are defined as the formula (I) dyestuff of the above. The reaction is carried out in aqueous solution at a temperature between 0 to 30° C., and below 20° C. is preferred. The acid generated in the reaction is neutralized by adding an acid-binding agent, and the pH is controlled between 1 to 4. Upon completion the reaction, the product of the above formula (V) can be obtained.

Step (b):

The compound of the formula (V) is reacted with the following formula (VI) compound to obtain the following formula (VII) compound,

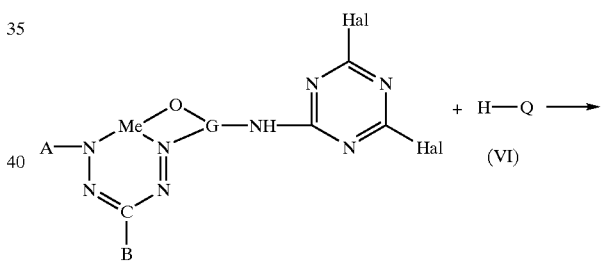

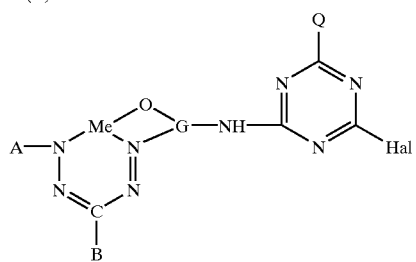

wherein Hal is —F, —Cl, —Br; A, B, G. and Me are defined as the formula (I) dyestuff of the above. The reaction temperature is controlled between 20 to 80+ C., and 40 to 60° C. is preferred. The acid generated in the reaction is neutralized by adding an acid binding agent. The pH is controlled between 4 to 12, and 7 to 10 is preferred. Upon completion the product of formula (VII) is obtained Step (c):

After the above reaction is completed, the compound of the following formula (VIII)

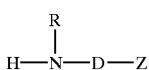
(VIII)

wherein R, D, and Z are defined as the above, is then added to the solution of the compound of formula (VII). The reaction temperature is controlled between 30 to 80° C., and 40 to 60° C. is preferred. The acid generated in the reaction is neutralized by adding an acid binding agent. The pH is controlled between 2 to 6, and 3 to 5 is preferred. Upon completion of the reaction, formazan derivatives represented by the above formula (I) dyestuff can be obtained.

In the above reaction steps (a) to (c), the formula (III) and (IV) and (VI) and (VIII) compounds each approximately one molar equivalent, can be reacted with one another in any sequence to yield the formazan derivatives represented by the above formula (1) dyestuff.

The preparation of the formula (III) compound is described in U.S. Pat. No. 5,858,026.

The formula (III) compound can be produced by diazotating an amine compound of the following formula (X) compound, then hydrolyzing the obtained compound in the presence of inorganic acid to give hydrazine compound, reacting the obtained compound with the aldehyde compound of the following formula (XI) to synthesize hydrazone compound, reacting the obtained compound with the compound of the formula (XII) to diazotate it, and then coupling them in the presence of metal ion to give the formula (XIII) compound,

A—NH$_2$, (X)

B—CHO, (XI)

H$_2$N—G—OH, (XII)

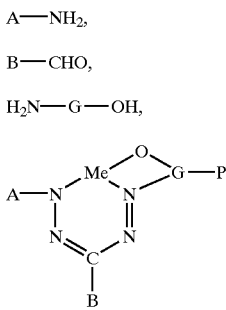
(XIII)

wherein P is nitro group or acetylamino group, and the definetion of A, B, G, and Me are same as those of the above formula (I). The formula (III) compound can be produced by reduction of nitro group or hydrolysis of acetylamino group of the formula (XIII) compound.

Metal ion used in this process are sulfate, carbonate, acetate, salilate, tartarate or chloride which concerns in the reaction.

Examples of the above formula (X) compound are: aniline-2-sulfonic acid, aniline-2,4-disulfonic acid, aniline-2,5-disulfonic acid, 4-methylaniline-2-sulfonic acid, ) 5-methylaniline-2-sulfonic acid, 3,4-dimethylaniline-2-sulfonic acid, 4,5-dimethylaniline-2-suffonic acid, 2-methylaniline-4,6-disulfonic acid, 4-methylaniline-2,5-disulfonic acid, 4-methoxyaniline-2-sulfonic acid, 5-methoxyaniline-2-sulfonic acid, 4-methoxy-5-chloroaniline-2-suflfonic acid, 4,5-dimethoxyaniline-2-sulfonic acid, 4-ethoxyaniline-2-sulfonic acid. 5-ethoxyaniline-2-sulfonic acid, 4-hydroxyaniline-2-sulfonic acid, 5-hydroxyaniline-2-suffonic acid, 5-hydroxyaniline-2,4-disulfonic acid, 4-carboxylaniline-2-sulfonic acid, 5-carboxylaniline-2-sufonic acid, 4-hydroxy-3-carboxylaniline-2-sulfonic acid, 4-nitroaniline-2-sulfonic acid, 5-nitroaniline-2-sulfonic acid, 2,4-dinitroaniline-6-sulfonic acid, 5-nitro-4-chloroaniline-2-sulfonic acid, 4-fluoroaniline-2-sulfonic acid, 3-chloroaniline-2-sulfonic acid, 4-chloroaniline-2-sulfonic acid, 5-chloroaniline-2-sulfonic acid, 4,5-dichloroaniline-2-sulfonic acid, 2,4-dichloroaniline-6-sulfonic acid, 2,4,5-trichloroaniline-6-sulfonic acid, 4-chloro-5-carboxylaniline-2-sulfonic acid, 2,5-dichloro-4-nitroaniline-6-sulfonic acid, 4-bromoaniline-2-sulfonic acid, 5-bromoaniline-2-sulfonic acid, 2,4-dibromoaniline-6-sulfonic acid, 3,4-dibromoaniline-6-sulfonic acid, 4-iodoaniline-2-sulfonic acid, 5-iodoaniline-2-sulfonic acid, 4-acetaminoaniline-2-sulfonic acid, 5-acetaminoaniline-2-sulfonic acid, 1,4-phenylenediamine-2,5-disulfonic acid, 1,3-phenylenediamine-4,6-disulfonic acid, 1-naphthylamine-2-sulfonic acid, 2-naphthylamine-1-sulfonic acid, 1-naphthylamine-2,4-disulfonic acid, 1-naphthylamine-2,5-disulfonic acid, 2-naphthylamine-1,5-disulfonic acid, 2-naphthylamine-1,7-disulfonic acid, 2-naphthylamine-3,6-disulfonic acid, 2-naphthylamine-3,7-disulfonic acid, 1-naphthylamine-2,4,7-trisulfonic acid, 2-naphthylamine-3,6,8-trisulfonic acid, 2-naphthylamine-1,5,7-trisulfonic acid.

Examples of the above formula (XI) compound are: benzaldehyde, 2-methoxybenzaldehyde, 3-methoxybenzaldehyde, 4-methoxybenzaidehyde, 4-methoxybenzaldehyde-3-sulfonic acid, 4-methoxy-3-chlorobenzaldehyde, 2-nitrobenzaldehyde, 3-nitrobenazldehyde, 2-hydroxybenzaldehyde, 2-chlorobenzaldehyde, 4-chlorobenzaldehyde, 2,4-dichlorobenzaldehyde, 2-chlorobenzaldehyde-5-sulfonic acid, benzaldehyde-2-sulfonic acid, benzaldehyde-3-sulfonic acid, benzaldehyde-4-sulfonic acid, benzaldehyde-2,4-disulfonic acid, 2-acetylaminobenzaldehyde, 4-acetylaminobenzaldehyde, 4-nitrobenzaldehyde-2-sulfonic acid, 3-methyl-2-nitrobenzaldehyde, 3-methy-6-nitrobenzaldehyde, 2-chloro-6-nitrobenzaldehyde, 1-naphthoaldehyde, 2-naphthoaldehyde, furan-2-aldehyde, thiophene-2-aldehyde, pyrrole-2-aldehyde, imidazole-2-aldehyde, pyrozole-5-aldehyde, pyridine-2-aldehyde, pyridine-3-aldehyde, pyridine-4-aldehyde, pyrimidine-5-aldehyde, quinoline-4-aldehyde, benzimidazole-2-aldehyde, acetaldehyde, butylaldehyde, heptaldehyde, acrylaldehyde, crotonaldehyde, phenacetaldehyde, cinnamaldehyde.

Examples of the above formula (XII) compound are: 2-aminophenol, 4-methyl-2-aminophenol, 5-methyl-2-aminophenol, 4-sulfo-2-aminophenol, 5-sulfo-2-aminophenol, 4-methoxy-2-aminophenol, 5-methylsulfonyl-2-aminophenol, 4-methylsulfamoyl-2-aminophenol, 1,4-dimethylsulfamoyl-2-aminophenol, 5-nitro-2-aminophenol, 4-bromo-2-aminophenol, 4,6-disulfo-2-aminophenol, 2-acetylamino-6-aminophenol-4-sulfonic acid, 6-nitro-4-sulfo-2-aminophenol, 4-nitro-6-suffo-2-aminophenol, 4-acetylamino-6-sulfo-2-aminophenol, 4-chloro-6-sulfo-2-aminophenol, 6-chloro-4-sulfo-2-aminophenol, 4-methylsulfonyl-2-aminophenol, 4-butyl sulfonyl-2-aminophenol, 4-ethylsulfonyl-2-aminophenol, 4-sulfamoyl-2-aminophenol, 1-amino-2- hydroxynaphthalene-4,6-desulfonic acid, 1-amino-2-hydroxy-6-chloronaphthalene-4-sulfonic acid, 4-methylol-6-sulfo-2-aminophenol.

The above formula (VIII) compound can be synthesised by reacting the following formula (XIV) compound with an alkylation reagent.

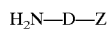

$$H_2N—D—Z \qquad (XIV)$$

Examples of the alkylation reagents are: alkylhalide, dialkylsulfate, monosubstituted ethylene, or oxide. Examples of the alkylhalide are methylchloride, ethylchloride, n-propylchloride, isopropylchloride, n-buthylchloride, isobuthylchloride, sec-buthylchloride, methylbromide, ethylbromide, n-propylbromide, isopropylbromide, n-buthylbromide, isobuthylbromide, sec-buthylbromide.

Examples of the dialkylsulfate are: dimethylsulfate, diethylsulfate, dipropylsulfate. Examples of the monosubstituted ethylene are: acrylonitrile, acrylic acid, methylacrylate, ethylacrylate, acrylamide, vinylsulfonic acid. Examples of the oxide are: ethyleneoxide, propyleneoxide, glycol, trimethyleneoxide, β-buthyloxide, 2-methyl-a-buthyleneoxide, 2-ethyl-3-methyleneoxide, methoxyethyleneoxide, or n-buthoxyleneoxide.

Examples of theformula (XIV) compound are: 1-aminobenzene-2,3-β-sulfatoethylsulfone, 1-aminobenzene-2,4-β-sulfatoethylsulfone, 1-aminobenzene-3-phosphatoethylbenzene, 1-amino-4-methylbenzene-3-β-sulfatoethylsulfone, 1-aminobenzene-3-β-chloroethylsulfone, 1-amino-4-methoxybenzene-3-β-sulfatoethylsulfone, 1-amino-2,5-dimethylbenzene-4-β-sulfatoethylsulfone, 1-amino-2-methoxybenzene-4-β-sulfatoethylsulfone, 1-amino-2-chlorobenzene-4-β-sulfatoethylsulfone, 1-amino-4-methoxybebzene-5-β-sulfatoethylsulfone, 2-aminonaphthalene-8-β-sulfatoethylsulfone-6-sulfonic acid, 2-aminonaphthalene-8-β-sulfatoethylsulfone, 1-amino-2,5-dimethoxybenzene-4-vinylsulfone, 1-amino-2-methoxy-5-methylbenzene-4-β-sulfatoethylsulfone, 2-aminonaphthalene-4,5,6-β-sulfatoethylsulfone, 2-aminonaphthalene-4,5,7-β-sulfatoethylsulfone, 1-amino-2-bromobenzene-4-vinylsulfone, 2-amino-8-sulfonaphthalene-6-β-sulfatoethylsulfone, 2-aminonaphthalene-8-β-phhosphatoethylsulfone-6-sulfonic acid, 2-aminonaphthalene-8-vinylsulfone-6-sulfonic acid, 1-amino-2-methoxy-5-methylbenzene-4-β-chloroethylsulfone, 1-aminobenzene-2,3-vinylsulfone, 1-aminobenzene-2,4-vinylsulfone, 1-amino-2-methoxy-5-chlorobenzene-4-β-chloroethylsulfone, 1-amino-2-methoxy-5-chlorobenzene-4-vinylsulfone, 1-amino-2-ethoxy-5-chlorobenzene-4-β-chloroethylsulfone, 1-amino-2-ethoxy-5-chlorobenzene-4-vinylsulfone, 2-aminonaphthalene-8-β-sulfatoethylsulfone-1-sulfonic acid, 5-chloroaniline-2-β-sulfatoethylsulfone, 5-sulfoaniline-2-β-sulfatoethylsulfone, aniline-2-β-phosphatoethylsulfone, 5-chloroaniline-2-β-phosphatoethylsulfone, 5-chloroaniline-2-vinylsulfone, 5-sulfoaniline-2-vinylsulfone, aniline-2-β-chloroethylsulfone, 5-chloroaniline-2-β-chloroethylsulfone, 5-sulfoaniline-2-β-chloroethylsulfone, aniline-2-β-thiosulfatoethylsulfone, 5-chloroaniline-2-β-thiosulfatoethylsulfone, 5-sulfoaniline-2-β-thiosulfatoethylsulfone, 3-Amino-2'-(2-sulfatoethylsulfonyl)ethylbenzamide, 4-Amino-2'-(2-sulfatoethylsulfonyl)ethylbenzamide, 2-amino-5-[(2-bromo-1-oxo-2-propenyl)amino]-1-benzenesulfonic acid, 2-amino-5-[(2,3-dibromopropionyl)amino]-1-benzenesulfonic acid, 2-amino-4-[(2-bromo-1-oxo-2-propenyl)amino]-1-benzenesulfonic acid, 2-amino-4-[(2,3-dibromopropionyl)amino]-1-benzenesulfonic acid.

Suitable acid binding agents include alkali metal hydroxides, alkali metal carbonates, or alkali metal bicarbonates. The hydroxides, carbonates, or bicarbonates of sodium, potassium, or lithium are valuable, and particularly sodium carbonates or bicarbonates are most valuable.

The dyestuffs of the present invention can be produced by the above methods, reaction conditions are fully described in the above description. The dyestuffs of the present invention can be purified by known processes such as spray drying, precipitation, or filtration. They can be in the form of powder, granules, particle or liquid and an auxiliary reagent, for example, retarding agent, leveling agent, assistant agent, surfactant agent, or dispersing agent may be added.

The dyestuffs of the present invention all contain at least one anionic group, such as a sulfonyl group. For convenience they are expressed as free acid in the specification. When the dyestuffs of the present invention are manufactured, purified or used, they often exist in the form of water soluble salt, especially the alkaline metallic salts, such as the sodium salt, lithium salt, potassium salt or ammonium salt, preferably sodium salt.

The dyes of the present invention are distinguished by high fixation and very good build-up. They are also distinguished by low substantivity and high exhaustion, and they are suitable for dyeing and printing of materials containing either cellulose fibers, such as cotton, synthetic cotton, hemp, and synthetic hemp. Materials of high light and wet fastness can be obtained. Also materials of good fastness to other agencies can be obtained The following examples illustrate the present invention, however, the present invention is not limited by these examples. The compounds are depicted as being in the free acid form although in reality they are usually in the form of metal salts such as alkali metal salts, in particular, the sodium salts.

The Examples that follow serve to illustrate the invention. Parts and percentages are by weight, unless otherwise stated. Parts by weight bear the same relation to parts by volume as the kilogram to the liter. The compounds written in the form of formulae are shown in the form of free acids; in general, they are prepared and isolated in the form of their alkali metal salts and used for dyeing in the form of their salts. In the same way it is possible to use the starting compounds and components mentioned in the form of free acids in the examples below in particular the Table of examples, in the synthesis as such or in the form of their salts, preferably alkali metal salts.

The absorption maxima (λ max) in the visible region reported for the compounds according to the present invention were determined from aqueous solutions of alkali metal salts.

More detailed examples are used to illustrate and to explain the present invention. The examples below, which are given simply by way of illustration, must not be taken to limit the scope of the invention.

EXAMPLE 1

Dicyclic formazan derivatives represented by the below formula (III-1) is obtained as described in U.S. Pat. No. 5,858,026.

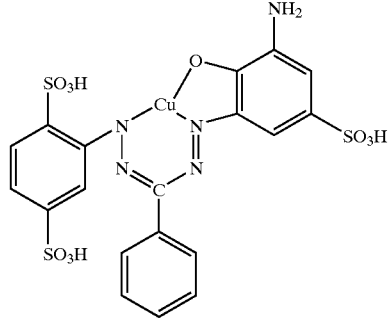

(III-1)

Phenylhydrazine-2,5-disulfonic acid is produced by diazotating aniline-2,5-disulfonic acid. 35.6 parts of benzaldehyde phenylhydrazone-2,5-sulfonic acid is produced by reacting the above obtained phenylhydrazine2,5-disulfonic acid with benzaldehyde. 35.6 parts of phenylhydrazone-2,5-sulfonic acid is dispersed in 200 parts of water and the pH of the dispersion is adjusted to pH 4 with a solution of 10% sodium hydroxide. 24.6 parts of 3-acetylamino-2-hydroxyaniline-5-sulfonic acid is diazotated and the resulting diazonium salt added to the. An aqueous solution of 26.2 parts of copper sulfate is added at pH 3 to 5, controlled by the addition of 20% aqueous sodium carbonate solution and stirring continued for one hour. The reaction is conducted at 40° C. to 50° C. for one hour. The reaction solution is cooled to the room temperature, and sodium chloride (20% w/v) is added and mixture stirred for one hour. The precipitated formazan is collected. The formazan derivative then is added to a solution of sodium hydroxide, the mixture is stirred at 90° C. for one hour to obtain the desired dyebase by removing the acetyl group.

EXAMPLE 2

The formazan derivative obtained in Example 1 is acidified to pH 3 to 4 with concentrated hydrochloric acid, and 16.6 parts of cyanuric chloride are added at 5° C. After one hour the formazan derivative represented by formula (V-1) is obtained:

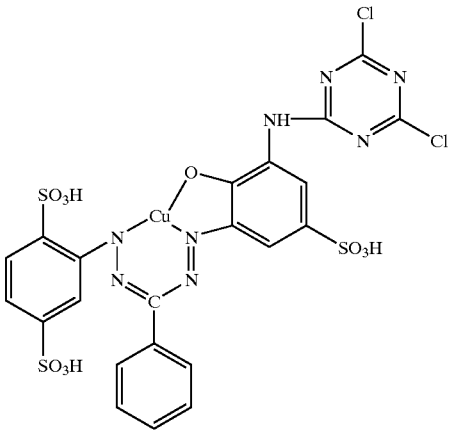

(V-1)

EXAMPLE 3

To a solution containing the formazan of Example 2 is added an agueous solution of 3.78 parts of cyanamide in about 100 parts of water, and the mixture is heated to 40~70° C. and maintained at a pH 8 to 10 by means of an aqueous sodium hydroxide solution until the reaction has ended after 3 to 4 hours to give the formazan derivative represented by formula (VII-1):

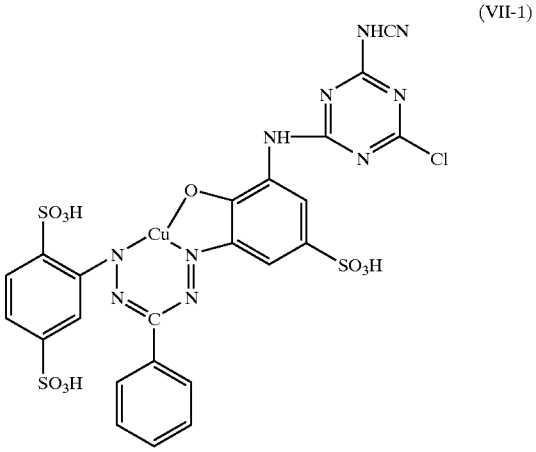

(VII-1)

EXAMPLE 4

To a solution containing the formazan derivative obtained in Example 3 are added 25.3 parts of 1-aminobenzeze-3-β-sulfatoethylsulfone. The mixture is heated to 55° C., and is maintained at pH 4 to 5 for 12 hours.

To the resulting solution is added sodium chloride to precipitate the desired product (I-1), ($\lambda_{max}$ 607 nm).

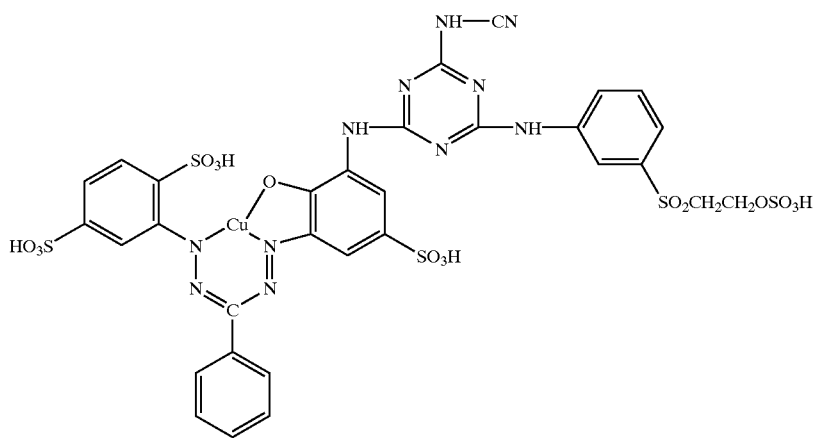

(I-1)

EXAMPLE 5 to 46

The procedures described in example 4 are repeated in a solution containing formazan derivatives obtained in examples 1,2 and 3 by using the following compounds instead of compounds used in examples 4. As a result, blue (607±2 nm) formazan derivatives are obtained.

| Example No. | Compound used |
|---|---|
| 5 | 1-N-ethylaminobenzene-4-β-sulfatoethylsulfone |
| 6 | 1-N-ethylaminobenzene-2-β-sulfatoethylsulfone |
| 7 | 1-N-ethylamino-4-methoxybenzene-3-β-sulfatoethylsulfone |
| 8 | 1-N-methylaminobenzene-3-β-sulfatoethylsulfone |
| 9 | 1-N-methylaminobenzene-4-β-sulfatoethylsulfone |
| 10 | 1-N-methylaminobenzene-2-β-sulfatoethylsulfone |
| 11 | 1-N-methylamino-4-methoxybenzene-3-β-sulfatoethylsulfone |
| 12 | 1-N-carbamoylethylaminobenzene-3-β-sulfatoethylsulfone |
| 13 | 1-N-carbamoylethylaminobenzene-4-β-sulfatoethylsulfone |
| 14 | 1-N-carbamoylethylaminobenzene-2-β-sulfatoethylsulfone |
| 15 | 1-N-carbamoylmethylamino-4-methoxybenzene-3-β-sulfatoethylsulfone |
| 16 | 1-N-n-propylaminobenzene-3-β-sulfatoethylsulfone |
| 17 | 1-N-n-propylaminobenzene-4-β-sulfatoethylsulfone |
| 18 | 1-N-n-propylaminobenzene-2-β-sulfatoethylsulfone |
| 19 | 1-N-n-propylamino-4-methoxybenzene-3-β-sulfatoethylsulfone |
| 20 | 1-N-β-cyanoethylaminobenzene-3-β-sulfatoethylsulfone |
| 21 | 1-N-β-cyanoethylaminobenzene-4-β-sulfatoethylsulfone |
| 22 | 1-N-β-cyanoethylaminobenzene-2-β-sulfatoethylsulfone |
| 23 | 1-N-β-cyanoethylamino-4-methoxybenzene-3-β-sulfatoethylsulfone |
| 24 | 1-N-β-hydroxyethylaminobenzene-3-β-sulfatoethylsulfone |
| 25 | 1-N-β-hydroxyethylaminobenzene-4-β-sulfatoethylsulfone |
| 26 | 1-N-β-hydroxyethylaminobenzene-2-β-sulfatoethylsulfone |
| 27 | 1-N-β-hydroxyethylamino-4-methoxybenzene-3-β-sulfatoethylsulfone |
| 28 | 1-N-β-sulfatoethylaminobenzene-3-β-sulfatoethylsulfone |
| 29 | 1-N-β-methoxycarbonylethylaminobenzene-3-β-sulfatoethylsulfone |
| 30 | 1-N-ethylamino-2-methoxybenzene-5-β-sulfatoethylsulfone |
| 31 | 1-N-ethylamino-2,4-dimethylbenzene-5-β-sulfatoethylsulfone |
| 32 | 1-N-ethylamino-2-methoxy-5-methylbenzene-3-β-sulfatoethylsulfone |
| 33 | 1-N-ethylaminonaphthalene-6-β-sulfatoethylsulfone |
| 34 | 1-N-ethylamino-8-sulfonaphthalene-6-β-sulfatoethylsulfone |
| 35 | 1-N-methylaminonaphthalene-8-β-sulfatoethylsulfone |
| 36 | 1-aminobenzene-4-β-sulfatoethylsulfone |
| 37 | 1-aminobenzene-2-β-sulfatoethylsulfone |
| 38 | 1-N-ethylaminobenzene-3-β-sulfatoethylsulfone |
| 39 | 1-amino-4-methoxybenzene-3-β-sulfatoethylsulfone |
| 40 | 1-amino-2-methoxybenzene-5-β-sulfatoethylsulfone |

-continued

| Example No. | Compound used |
|---|---|
| 41 | 1-amino-2-methoxy-5-methylbenzene-4-β-sulfatoethylsulfone |
| 42 | 1-amino-2,4-dimethylbenzene-5-β-sulfatoethylsulfone |
| 43 | 1-aminonaphthalene-6-β-sulfatoethylsulfone |
| 44 | 1-amino-8-sulfonaphthalene-6-β-sulfatoethylsulfone |
| 45 | 1-aminonaphthalene-8-β-sulfatoethylsulfone |
| 46 | 5-(2',3'-dibromopropionamide)aniline-2-sulfonic acid |

EXAMPLE 47

A solution containing the formazan derivative obtained in example 2 is heated to 55° C. at pH 4 to 5 for 12 hours. Sodium chloride is added to precipitate the blue formazan of formula (VII-2):

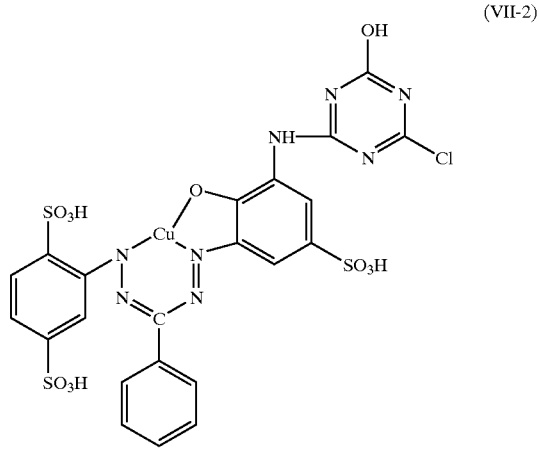

(VII-2)

EXAMPLE 48

To a solution of the formazan derivative obtained in Example 47 are added 25.3 parts of 1-aminobenzeze-3-β-sulfatoethylsulfone; the mixture is stirred at 55° C. and at pH 4 to 5 for 12 hours. Sodium chloride is added to precipitate the blue formazan (14) ($\lambda_{max}$ 607 nm).

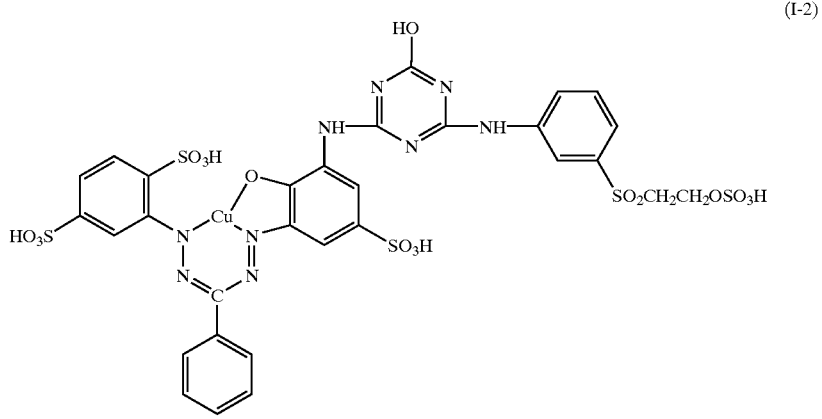

(I-2)

EXAMPLE 49 to 90

Procedure described in Example 48 is repeated in a solution containing formazan derivatives obtained in Example 47 by using the following compounds instead of compounds used in Example 48. As a result, blue ($\lambda_{max}$ 607±2 nm) formazan derivatives are obtained.

| Example No. | Compound used |
|---|---|
| 49 | 1-N-ethylaminobenzene-4-β-sulfatoethylsulfone |
| 50 | 1-N-ethylaminobenzene-2-β-sulfatoethylsulfone |
| 51 | 1-N-ethylamino-4-methoxybenzene-3-β-sulfatoethylsulfone |
| 52 | 1-N-methylaminobenzene-3-β-sulfatoethylsulfone |
| 53 | 1-N-methylaminobenzene-4-β-sulfatoethylsulfone |
| 54 | 1-N-methylaminobenzene-2-β-sulfatoethylsulfone |
| 55 | 1-N-methylamino-4-methoxybenzene-3-β-sulfatoethylsulfone |
| 56 | 1-N-β-carbamoylethylaminobenzene-3-β-sulfatoethylsulfone |
| 57 | 1-N-β-carbamoylethylaminobenzene-4-β-sulfatoethylsulfone |
| 58 | 1-N-β-carbamoylethylaminobenzene-2-β-sulfatoethylsulfone |
| 59 | 1-N-β-carbamoylmethylamino-4-methoxybenzene-3-β-sulfatoethylsulfone |
| 60 | 1-N-n-propylaminobenzene-3-β-sulfatoethylsulfone |
| 61 | 1-N-n-propylaminobenzene-4-β-sulfatoethylsulfone |
| 62 | 1-N-n-propylaminobenzene-2-β-sulfatoethylsulfone |
| 63 | 1-N-n-propylamino-4-methoxybenzene-3-β-sulfatoethylsulfone |
| 64 | 1-N-β-cyanoethylaminobenzene-3-β-sulfatoethylsulfone |
| 65 | 1-N-β-cyanoethylaminobenzene-4-β-sulfatoethylsulfone |
| 66 | 1-N-β-cyanoethylaminobenzene-2-β-sulfatoethylsulfone |
| 67 | 1-N-β-cyanoethylamino-4-methoxybenzene-3-β-sulfatoethylsulfone |
| 68 | 1-N-β-hydroxyethylaminobenzene-3-β-sulfatoethylsulfone |
| 69 | 1-N-β-hydroxyethylaminobenzene-4-β-sulfatoethylsulfone |
| 70 | 1-N-β-hydroxyethylaminobenzene-2-β-sulfatoethylsulfone |
| 71 | 1-N-β-hydroxyethylamino-4-methoxybenzene-3-β-sulfatoethylsulfone |

-continued

| Example No. | Compound used |
|---|---|
| 72 | 1-N-β-sulfatoethylaminobenzene-3-β-sulfatoethylsulfone |
| 73 | 1-N-β-methoxycarbonylethylaminobenzene-3-β-sulfatoethylsulfone |
| 74 | 1-N-ethylamino-2-methoxybenzene-5-β-sulfatoethylsulfone |
| 75 | 1-N-ethylamino-2,4-dimethylbenzene-5-β-sulfatoethylsulfone |
| 76 | 1-N-ethylamino-2-methoxy-5-methylbenzene-3-β-sulfatoethylsulfone |
| 77 | 1-N-ethylaminonaphthalene-6-β-sulfatoethylsulfone |
| 78 | 1-N-ethylamino-8-sulfonaphthalene-6-β-sulfatoethylsulfone |
| 79 | 1-N-methylaminonaphthalene-8-β-sulfatoethylsulfone |
| 80 | 1-aminobenzene-4-β-sulfatoethylsulfone |
| 81 | 1-aminobenzene-2-β-sulfatoethylsulfone |
| 82 | 1-N-ethylaminobenzene-3-β-sulfatoethylsulfone |
| 83 | 1-amino-4-methoxybenzene-3-β-sulfatoethylsulfone |
| 84 | 1-amino-2-methoxybenzene-5-β-sulfatoethylsulfone |
| 85 | 1-amino-2-methoxy-5-methylbenzene-4-β-sulfatoethylsulfone |
| 86 | 1-amino-2,4-dimethylbenzene-5-β-sulfatoethylsulfone |
| 87 | 1-aminonaphthalene-6-β-sulfatoethylsulfone |
| 88 | 1-amino-8-sulfonaphthalene-6-β-sulfatoethylsulfone |
| 89 | 1-aminonaphthalene-8-β-sulfatoethylsulfone |
| 90 | 5 -(2',3'-dibromopropionamide)aniline-2-sulfonic acid |

EXAMPLE 91

To a solution of the formazan derivative obtained in Example 2 are added 25.3 parts of 1-aminobenzeze-3-β-sulfatoethylsulfone. The mixture stirred at 55° C. and at pH 4 to 5 for 12 hours to give the formazan derivative, formula (XV), below.

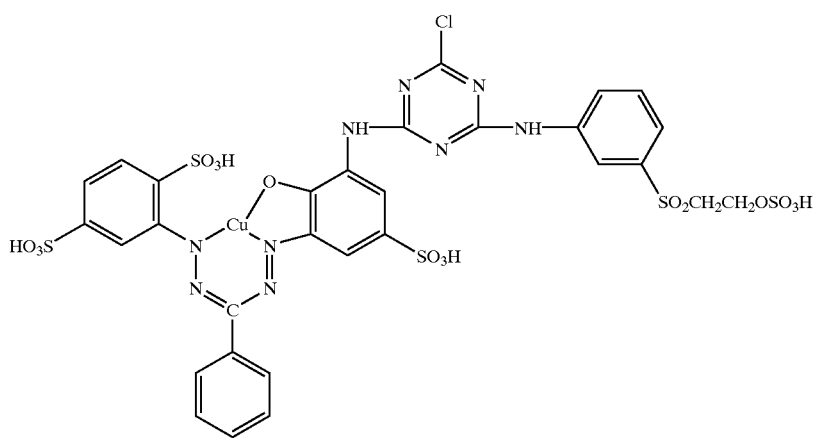

(XV)

EXAMPLE 92

To a solution containing the formazan derivative obtained in Example 91 are added 11.07 parts of nicotinic acid: the mixture is stirred at 60° C. and at pH 4 to 4.5 for 12 hours. Sodium chloride is added to precipitate the formazan of formula (I-3) ($\lambda_{max}$ 607 nm).

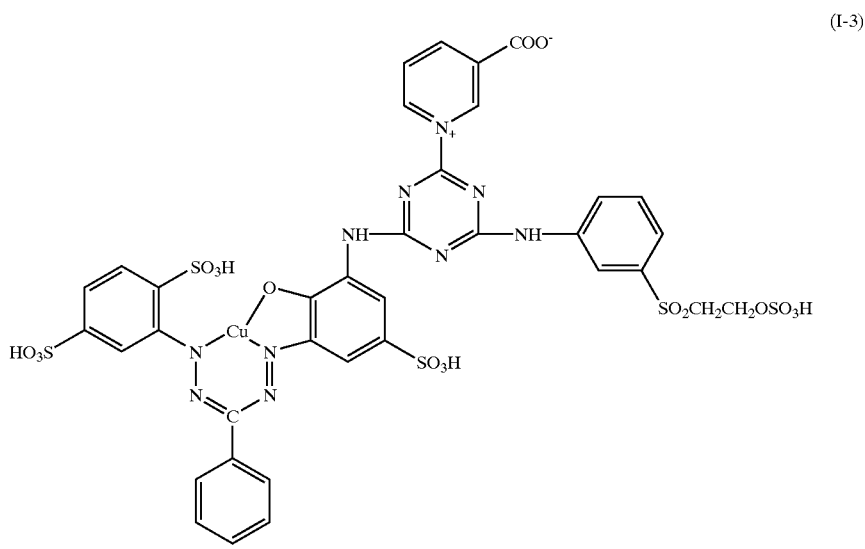

(I-3)

EXAMPLE 93 to 134

The procedure described in Example 92 is repeated in a solution containing formazan derivatives obtained in Example 91 by using the following compounds instead of compound used in Example 91. As a result, blue (607±2 nm) formazan derivatives are obtained.

| Example No. | Compound used |
|---|---|
| 93 | 1-N-ethylaminobenzene-4-β-sulfatoethylsulfone |
| 94 | 1-N-ethylaminobenzene-2-β-sulfatoethylsulfone |
| 95 | 1-N-ethylamino-4-methoxybenzene-3-β-sulfatoethylsulfone |
| 96 | 1-N-methylaminobenzene-3-β-sulfatoethylsulfone |
| 97 | 1-N-methylaminobenzene-4-β-sulfatoethylsulfone |
| 98 | 1-N-methylaminobenzene-2-β-sulfatoethylsulfone |
| 99 | 1-N-methylamino-4-methoxybenzene-3-β-sulfatoethylsulfone |
| 100 | 1-N-β-carbamoylethylaminobenzene-3-β-sulfatoethylsulfone |
| 101 | 1-N-β-carbamoylethylaminobenzene-4-β-sulfatoethylsulfone |
| 102 | 1-N-β-carbamoylethylaminobenzene-2-β-sulfatoethylsulfone |
| 103 | 1-N-β-carbamoylmethylamino-4-methoxybenzene-3-sulfatoethylsulfone |
| 104 | 1-N-n-propylaminobenzene-3-β-sulfatoethylsulfone |
| 105 | 1-N-n-propylaminobenzene-4-β-sulfatoethylsulfone |
| 106 | 1-N-n-propylaminobenzene-2-β-sulfatoethylsulfone |

| Example No. | Compound used |
|---|---|
| 107 | 1-N-n-propylamino-4-methoxybenzene-3-β-sulfatoethylsulfone |
| 108 | 1-N-β-cyanoethylaminobenzene-3-β-sulfatoethylsulfone |
| 109 | 1-N-β-cyanoethylaminobenzene-4-β-sulfatoethylsulfone |
| 110 | 1-N-β-cyanoethylaminobenzene-2-β-sulfatoethylsulfone |
| 111 | 1-N-β-cyanoethylamino-4-methoxybenzene-3-β-sulfatoethylsulfone |
| 112 | 1-N-β-hydroxyethylaminobenzene-3-β-sulfatoethylsulfone |
| 113 | 1-N-β-hydroxyethylaminobenzene-4-β-sulfatoethylsulfone |
| 114 | 1-N-β-hydroxyethylaminobenzene-2-β-sulfatoethylsulfone |
| 115 | 1-N-β-hydroxyethylamino-4-methoxybenzene-3-β-sulfatoethylsulfone |
| 116 | 1-N-β-sulfatoethylaminobenzene-3-β-sulfatoethylsulfone |
| 117 | 1-N-β-methoxycarbonylethylaminobenzene-3-β-sulfatoethylsulfone |
| 118 | 1-N-ethylamino-2-methoxybenzene-5-β-sulfatoethylsulfone |
| 119 | 1-N-ethylamino-2,4-dimethylbenzene-5-β-sulfatoethylsulfone |
| 120 | 1-N-ethylamino-2-methoxy-5-methylbenzene-3-β-sulfatoethylsulfone |
| 121 | 1-N-ethylaminonaphthalene-6-β-sulfatoethylsulfone |
| 122 | 1-N-ethylamino-8-sulfonaphthalene-6-β-sulfatoethylsulfone |
| 123 | 1-N-methylaminonaphthalene-8-β-sulfatoethylsulfone |
| 124 | 1-aminobenzene-4-β-sulfatoethylsulfone |
| 125 | 1-aminobenzene-2-β-sulfatoethylsulfone |
| 126 | 1-N-ethylaminobenzene-3-β-sulfatoethylsulfone |
| 127 | 1-amino-4-methoxybenzene-3-β-sulfatoethylsulfone |
| 128 | 1-amino-2-methoxybenzene-5-β-sulfatoethylsulfone |
| 129 | 1-amino-2-methoxy-5-methylbenzene-4-β-sulfatoethylsulfone |
| 130 | 1-amino-2,4-dimethylbenzene-5-β-sulfatoethylsulfone |
| 131 | 1-aminonaphthalene-6-β-sulfatoethylsulfone |
| 132 | 1-amino-8-sulfonaphthalene-6-β-sulfatoethylsulfone |
| 133 | 1-aminonaphthalene-8-β-sulfatoethylsulfone |
| 134 | 5-(2',3'-dibromopropionamide)aniline-2-sulfonic acid |

EXAMPLE 135

To a solution containing the formazan derivative obtained in Example 2 are added 8.28 parts of thioglycolic acid: the mixture is stirred at 45° C. and pH 7 to 8 for 6 hours to give the formazan derivative represented by the below formula (VII-3):

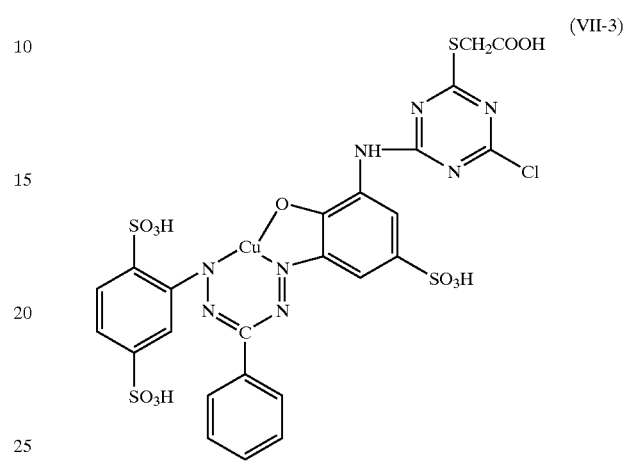

(VII-3)

EXAMPLE 136

To a solution containing the formazan derivative obtained in Example 135 are added 25.26 parts of 1-aminobenzeze-3-β-sulfatoethylsulfone at 60° C. and at pH 4 to 4.5 for 12 hours. Sodium chloride is added to precipitate the formazan derivative of formula (I-4), $\lambda_{max}$=607nm.

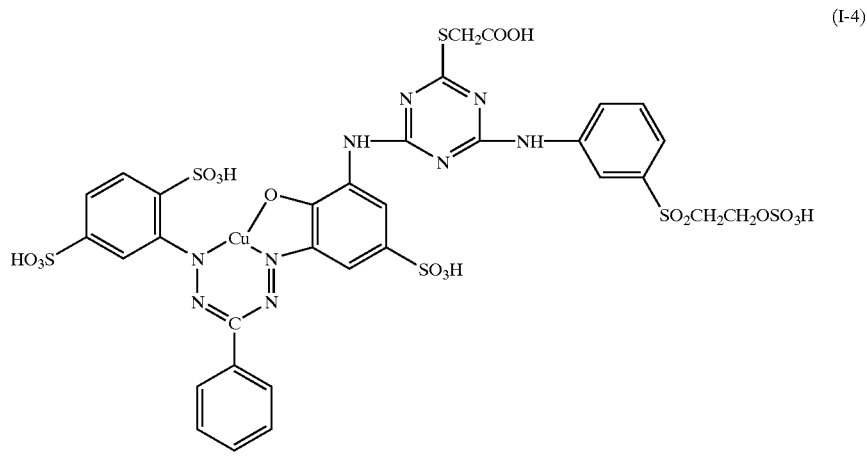

(I-4)

EXAMPLE 137 to 178

The procedure described in Example 136 is repeated with a solution containing the formazan derivative obtained in Example 135 except that in place of 1-aminobenzeze-3-β-sulfatoethylsulfone compounds listed below are used. As a result, blue (607±2 nm) formazan derivatives are obtained.

| Example No. | Compound used |
|---|---|
| 137 | 1-N-ethylaminobenzene-4-β-sulfatoethylsulfone |
| 138 | 1-N-ethylaminobenzene-2-β-sulfatoethylsulfone |
| 139 | 1-N-ethylamino-4-methoxybenzene-3-β-sulfatoethylsulfone |
| 140 | 1-N-methylaminobenzene-3-β-sulfatoethylsulfone |
| 141 | 1-N-methylaminobenzene-4-β-sulfatoethylsulfone |
| 142 | 1-N-methylaminobenzene-2-β-sulfatoethylsulfone |
| 143 | 1-N-methylamino-4-methoxybenzene-3-β-sulfatoethylsulfone |
| 144 | 1-N-β-carbamoylethylaminobenzene-3-β-sulfatoethylsulfone |
| 145 | 1-N-β-carbamoylethylaminobenzene-4-β-sulfatoethylsulfone |
| 146 | 1-N-β-carbamoylethylaminobenzene-2-β-sulfatoethylsulfone |
| 147 | 1-N-β-carbamoylmethylamino-4-methoxybenzene-3-β-sulfatoethylsulfone |
| 148 | 1-N-n-propylaminobenzene-3-β-sulfatoethylsulfone |
| 149 | 1-N-n-propylaminobenzene-4-β-sulfatoethylsulfone |
| 150 | 1-N-n-propylaminobenzene-2-β-sulfatoethylsulfone |
| 151 | 1-N-n-propylamino-4-methoxybenzene-3-β-sulfatoethylsulfone |
| 152 | 1-N-β-cyanoethylaminobenzene-3-β-sulfatoethylsulfone |
| 153 | 1-N-β-cyanoethylaminobenzene-4-β-sulfatoethylsulfone |
| 154 | 1-N-β-cyanoethylaminobenzene-2-β-sulfatoethylsulfone |
| 155 | 1-N-β-cyanoethylamino-4-methoxybenzene-3-β-sulfatoethylsulfone |
| 156 | 1-N-β-hydroxyethylaminobenzene-3-β-sulfatoethylsulfone |
| 157 | 1-N-β-hydroxyethylaminobenzene-4-β-sulfatoethylsulfone |
| 158 | 1-N-β-hydroxyethylaminobenzene-2-β-sulfatoethylsulfone |
| 159 | 1-N-β-hydroxyethylamino-4-methoxybenzene-3-β-sulfatoethylsulfone |
| 160 | 1-N-β-sulfatoethylaminobenzene-3-β-sulfatoethylsulfone |
| 161 | 1-N-β-methoxycarbonylethylaminobenzene-3-β-sulfatoethylsulfone |
| 162 | 1-N-ethylamino-2-methoxybenzene-5-β-sulfatoethylsulfone |
| 163 | 1-N-ethylamino-2,4-dimethylbenzene-5-β-sulfatoethylsulfone |
| 164 | 1-N-ethylamino-2-methoxy-5-methylbenzene-3-β-sulfatoethylsulfone |
| 165 | 1-N-ethylaminonaphthalene-6-β-sulfatoethylsulfone |
| 166 | 1-N-ethylamino-8-sulfonaphthalene-6-β-sulfatoethylsulfone |
| 167 | 1-N-methylaminonaphthalene-8-β-sulfatoethylsulfone |
| 168 | 1-aminobenzene-4-β-sulfatoethylsulfone |
| 169 | 1-aminobenzene-2-β-sulfatoethylsulfone |
| 170 | 1-N-ethylaminobenzene-3-β-sulfatoethylsulfone |
| 171 | 1-amino-4-methoxybenzene-3-β-sulfatoethylsulfone |
| 172 | 1-amino-2-methoxybenzene-5-β-sulfatoethylsulfone |
| 173 | 1-amino-2-methoxy-5-methylbenzene-4-β-sulfatoethylsulfone |
| 174 | 1-amino-2,4-dimethylbenzene-5-β-sulfatoethylsulfone |
| 175 | 1-aminonaphthalene-6-β-sulfatoethylsulfone |
| 176 | 1-amino-8-sulfonaphthalene-6-β-sulfatoethylsulfone |
| 177 | 1-aminonaphthalene-8-β-sulfatoethylsulfone |
| 178 | 5-(2',3'-dibromopropionamide)aniline-2-sulfonic acid |

EXAMPLE 179

Urea 100 parts, m-nitrobenzene sulfonic acid sodium salt, 10 parts, sodium bicarbonate, 20 parts, sodium alginate, 55 parts, warm water, 815 parts, were stirred in a vessel to give a completely homogeneous printing paste.

Dyestuff of the formula (I-1) (prepared from the example 4), 3 parts, and the above printing paste, 100 parts, were mixed together to make a homogeneous colored paste. A 100 mesh printing screen covering an adequate sized piece of cotton fabric was painted with this colored paste on printing screen to give a colored fabric.

The colored fabric was placed in an oven at 65° C. to dry for 5 minutes then taken out, dried and put into a steam oven using saturated steam for 10 minutes at 102–105° C.

The colored fabric was washed with cold water, hot water, and soap then dried to obtain a blue fabric with good build-up, wet fastness and wash fastness.

EXAMPLE 180

Dyestuff of the formula (I-1) (prepared from the example 4), 3 parts was dissolved in 100 parts of water to give a padding liquor. 25 ml of alkali solution (NaOH (38°Be') 15 ml/l and Glauberf's salt 30 parts/l) were added to the padding liquor. The resultant solution was put into a pad roller machine. The cotton fabric was padded by the roller pad machine, then was batched for 4 hours. The padded fabric was washed with cold water, hot water, and soap solution then dried to obtain a blue fabric with good properties of build-up, wet fastness and wash fastness.

EXAMPLE 181

Dyestuff of the formula (I-1), (prepared as described in Example 4) 0.25 parts was dissolved in 250 parts of water. To 40 ml of this solution, in a dyeing bottle, was added cotton fabric, Glauber's salt,2.4 parts, and 32% alkali solution, 2.5 parts. The dyeing bottle was shaken at 60° C. for 60 minutes. The colored fabric was washed with cold water, hot water, and soap solution then dried to obtain a blue fabric with good properties of build-up, wet fastness and wash fastness.

EXAMPLE 182

Dyestuff of the formula (I-2), (prepared as described in Example 48) 0.25 parts was dissolved in 250 parts of water. To 40 ml of this solution, in a dyeing bottle, was added cotton fabric, Glauber's salt, 2.4 parts, and 32% alkali solution, 2.5 parts. The dyeing bottle was shaken at 60° C. for 60 minutes. The colored fabric was washed with cold water, hot water, and soap solution then dried to obtain a blue fabric with good properties of build-up, wet fastness and wash fastness.

EXAMPLE 183

Dyestuff of the formula (I-3), (prepared as described in Example 92) 0.25 parts was dissolved in 250 parts of water. To 40 ml of this solution, in a dyeing bottle, was added cotton fabric, Glauber's salt, 2.4 parts, and 32% alkali solution, 2.5 parts. The dyeing bottle was shaken at 60° C. for 60 minutes. The colored fabric was washed with cold water, hot water, and soap solution then dried to obtain a blue fabric with good properties of build-up, wet fastness and wash fastness.

EXAMPLE 184

Dyestuff of the formula (I-4), (prepared as described in Example 136) 0.25 parts was dissolved in 250 parts of water. To 40 ml of this solution, in a dyeing bottle, was added cotton fabric, Glauber's salt, 2.4 parts, and 32% alkali solution, 2.5 parts. The dyeing bottle was shaken at 60° C. for 60 minutes. The colored fabric was washed with cold water, hot water, and soap solution then dried to obtain a blue fabric with good properties of build-up, wet fastness and wash fastness.

What is claimed is:

1. A reactive formazane dyestuff of the following formula (I):

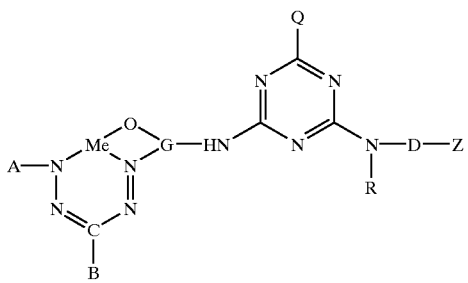

wherein:
- A is phenyl or naphthyl having 1 to 4 substituent groups, said substituent groups are selected from the group consisting of halogen, $C_{1-4}$ alkyl, $C_{1-4}$ alkoxyl, nitro, amino, hydroxyl, carboxyl, phosphonic acid and sulfo group, and wherein at least one substituent group is a sulfo group, said sulfo group is in the position ortho to the N-atom of hydrazone compound;
- B is a straight or branched $C_{1-8}$ alkyl, or a phenyl, naphthyl or heteroaromatic group having 0 to 3 substituent groups, said substituent groups are selected from the group consisting of halogen, $C_{1-4}$ alkyl, $C_{1-4}$ alkoxyl, nitro, amino, hydroxyl, carboxyl, phosphonic acid and sulfo group, said heteroaromatic group is selected from the group consisting of: furan, thiophene, pyrrole, imidazole, pyrazole, pyridine, pyrimidine, quinoline, or benzimidazole;
- G is a phenyl or naphthyl having 0 to 3 substituent groups, said substituent groups are selected from the group consisting of halogen, $C_{1-4}$ alkyl, $C_{1-4}$ alkoxyl, nitro, amino, hydroxyl, carboxyl, phosphonic acid and sulfo group;
- Q is —NHCN, —OH, —SCH$_2$COOH or 3-carboxypyridinium;
- D s a phenyl or naphthyl having 0 to 3 substituent groups, said substituent groups are selected from the group consisting of halogen, $C_{1-4}$ alkyl, $C_{1-4}$ alkoxyl, nitro, amino, hydroxyl, carboxyl, phosphonic acid and sulfo group;
- Me is Cu, Ni or Co metal ion;
- R is H, $C_{1-8}$ alkyl, or $C_{1-8}$ alkyl having at least one substituent group, said substituent group is selected from the group consisting of hydroxyl, carboxyl, sulfo, carbamoyl, and methoxy carbonyl;
- Z is —SO$_2$—Y, —CONH—(CH$_2$)$_h$—SO$_2$—Y, —(O)$_p$—(CH$_2$)$_g$—CONH—(CH$_2$)$_h$—SO$_2$—Y, or —NH—CO—T;
- Y is —CH=CH$_2$, or —CH$_2$—CH$_2$—U;
- U is —OSO$_3$H, Cl, Br, —OPO$_3$H$_2$, —SSO$_3$H or

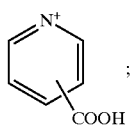

- T is α, β-halopropionyl or α-haloacryloyl;
- g and h independently are an integer from 1 to 6;
- P is the number 0 or 1.

2. The reactive formazane dyestuff of claim 1, wherein A is phenyl having 1 to 4 substituent groups.

3. The reactive formazane dyestuff of claim 1, wherein B is phenyl having 0 to 3 substituent groups.

4. The reactive formazane dyestuff of claim 1, wherein G is phenyl having 0 to 3 substituent groups.

5. The reactive formazane dyestuff of claim 1, wherein D is phenyl having 0 to 3 substituent groups.

6. The reactive formazane dyestuff of claim 1, wherein Me is Cu metal ion.

7. The reactive formazane dyestuff of claim 1, wherein R is H or $C_{1-4}$ alkyl.

8. The reactive formazane dyestuff of claim 1, wherein Z is —SO$_2$—Y or —NH—CO—T, Y is —CH=CH$_2$, or —CH$_2$—CH$_2$—OSO$_3$H, T is α, β-halopropionyl or α-haloacryloyl.

9. The reactive formazane dyestuff of claim 1, wherein formula (I) dyestuff is the following formula (Ia) dyestuff,

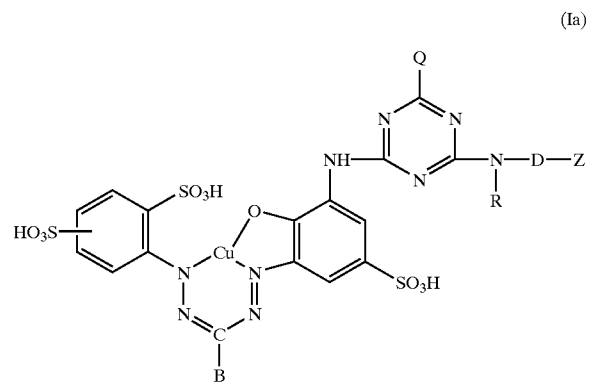

wherein

- B is a straight or branched $C_{1-8}$ alkyl, or a phenyl, naphthyl or heteroaromatic group having 0 to 3 substituent groups, said substituent groups are selected from the group consisting of halogen, C1-4 alkyl, $C_{1-4}$ alkoxyl, nitro, amino, hydroxyl, carboxyl, phosphonic acid and sulfo group, said heteroaromatic group is selected from the group consisting of: furan, thiophene, pyrrole, imidazole, pyrazole, pyridine, pyrimidine, quinoline, or benzimidazole;
- Q is —NHCN, —OH, —SCH$_2$COOH or 3-carboxypyridinium;
- D s a phenyl or naphthyl having 0 to 3 substituent groups, said substituent groups are selected from the group consisting of halogen, $C_{1-4}$ alkyl, $C_{1-4}$ alkoxyl, nitro, amino, hydroxyl, carboxyl, phosphonic acid and sulfo group;
- R is H, $C_{1-8}$ alkyl, or $C_{1-8}$ alkyl having at least one substituent group, said substituent group is selected from the group consisting of hydroxyl, carboxyl, sulfo, carbamoyl, and methoxy carbonyl;

Z is —SO$_2$—Y, —CONH—(CH$_2$)$_h$—SO$_2$—Y, —(O)$_p$—(CH$_2$)$_g$—CONH—(CH$_2$)$_h$—SO$_2$—Y, or —NH—CO—T;

Y is —CH=CH$_2$, or —CH$_2$—CH$_2$—U;

U is —OSO$_3$H, Cl, Br, —OPO$_3$H$_2$, —SSO$_3$H or

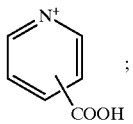

T is α, β-halopropionyl or α-haloacryloyl;

g and h independently are an integer from 1 to 6;

P is the number 0 or 1.

10. The reactive formazane dyestuff of claim 9, wherein B is phenyl having 0 to 3 substituent groups.

11. The reactive formazane dyestuff of claim 9, wherein D is phenyl having 0 to 3 substituent groups.

12. The reactive formazane dyestuff of claim 9, wherein R is H or C$_{1-4}$ alkyl.

13. The reactive formazane dyestuff of claim 9, wherein Z is —SO$_2$—Y or —NH—CO—T, Y is —CH=CH$_2$, or —CH$_2$—CH$_2$—OSO$_3$H, T is α, β-halopropionyl or α-haloacryloyl.

14. The reactive formazane dyestuff of claim 1, wherein formula (I) dyestuff is the following formula (Ib) dyestuff,

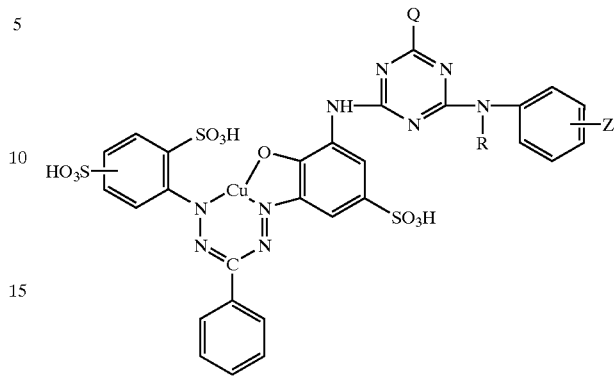

wherein

Q is —NHCN—OH—SCH$_2$COOH or 3-carboxypyridinium;

R is H, C$_{1-4}$ alkyl;

Z is —SO$_2$—Y;

Y is —CH=CH$_2$ or —CH$_2$—CH$_2$—U;

U is —OSO$_3$H, Cl or Br.

15. The reactive formazane dyestuff of claim 14, wherein Z is —SO$_2$—CH$_2$—CH$_2$—OSO$_3$H.

16. The reactive formazane dyestuff of claim 14, wherein R is H.

17. The reactive formazane dyestuff of claim 14, wherein said formula (Ib) dyestuff is the following formula (I-1) dyestuff.

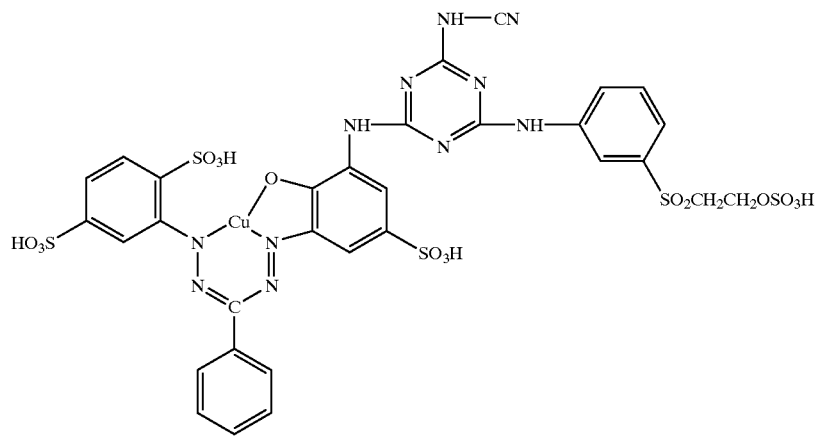

18. The reactive formazane dyestuff of claim 14, wherein said formula (Ib) dye stuff is the following formula (I-2) dye stuff.
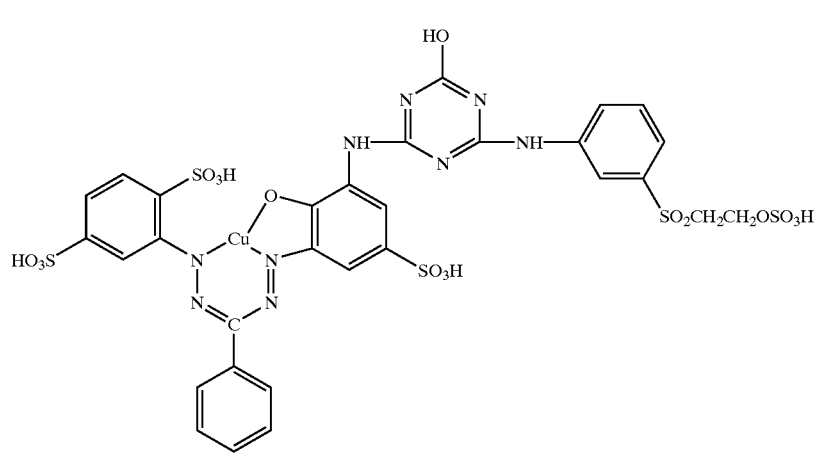
(I-2)
19. The reactive formazane dyestuff of claim 14, wherein said formula (Ib) dyestuff is the following formula (I-3) dyestuff.
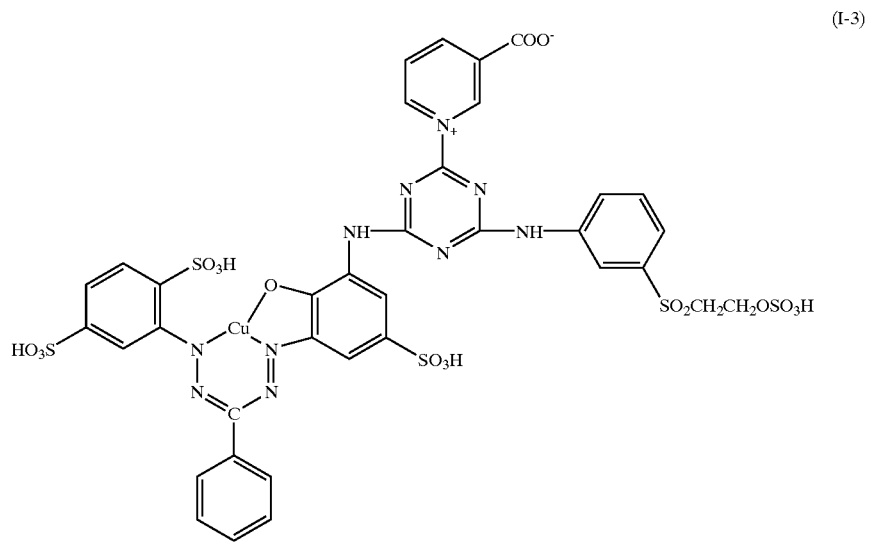
(I-3)
20. The reactive formazane dyestuff of claim 14, wherein said formula (Ib) dyestuff is the following formula (I-4) dyestuff.

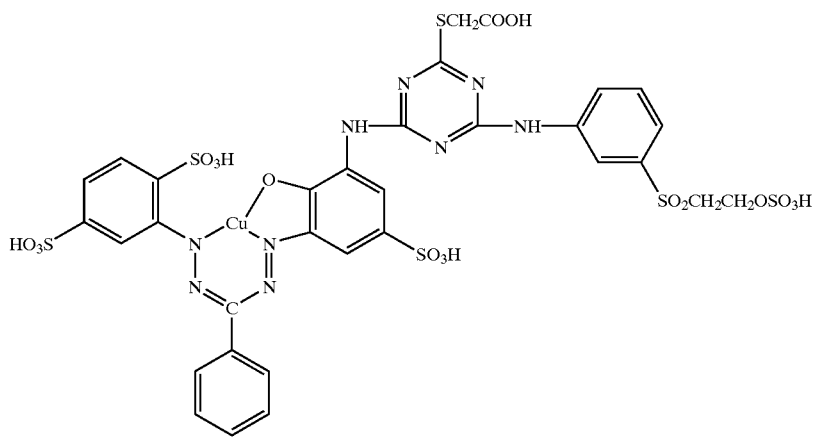
(I-4)
21. A process for dyeing and printing cellulosic fiber materials, which comprises treating the fiber materials with a dye of the formula (1) according to claim 1 in aqueous solution.
22. The process of claim 21, wherein the cellulosic fiber materials are cotton.
* * * * *

UNITED STATES PATENT AND TRADEMARK OFFICE
CERTIFICATE OF CORRECTION

PATENT NO.    : 6,407,220 B1                                              Page 1 of 1
DATED         : June 18, 2002
INVENTOR(S)   : Huei Ching Huang et al.

It is certified that error appears in the above-identified patent and that said Letters Patent is hereby corrected as shown below:

<u>Column 4,</u>
Line 45, insert the following identifier before the formula -- (Ic) --

<u>Column 24,</u>
Line 57, should read as -- D is a phenyl or naphthyl having 0 to 3 substituent groups, --

<u>Column 26,</u>
Line 21, should read as -- Q is -NHCN, -OH, -SCH$_2$COOH or --

Signed and Sealed this

Eleventh Day of November, 2003

JAMES E. ROGAN
*Director of the United States Patent and Trademark Office*